April 1, 1930.                  J. G. ELLINGER                  1,752,336
              ACCELERATOR SAFETY LOCKING DEVICE AND BRAKE ALARM
                      Filed July 1, 1929        2 Sheets-Sheet 1
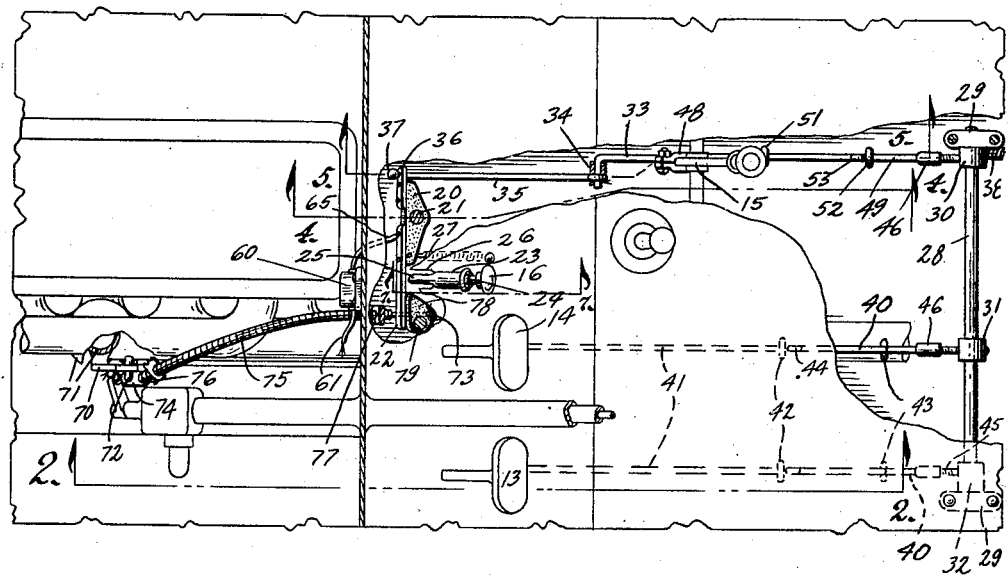
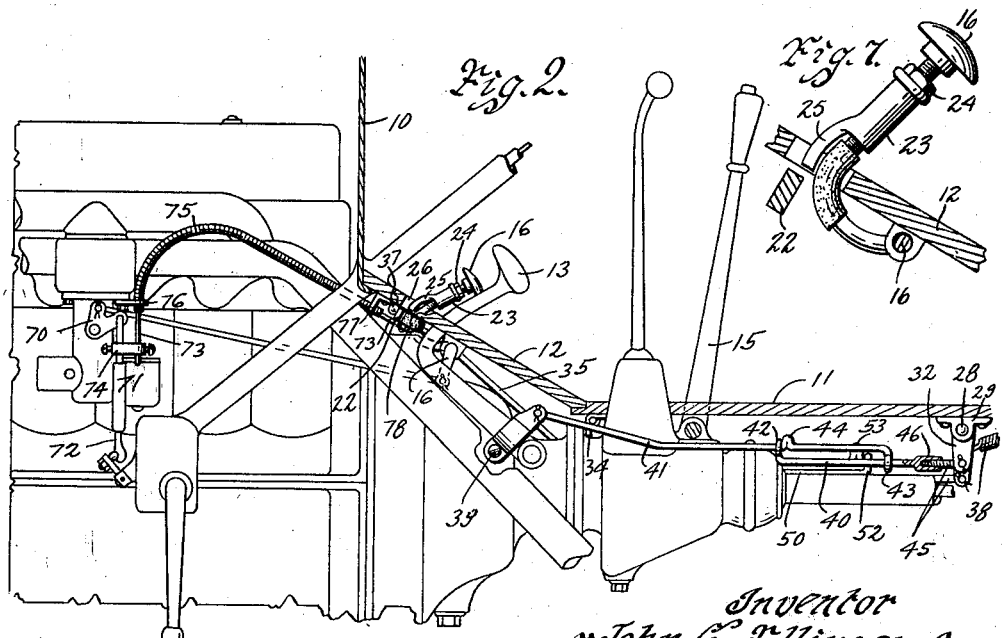
Inventor
John G. Ellinger
by Bair, Freeman & Sinclair
Attorneys

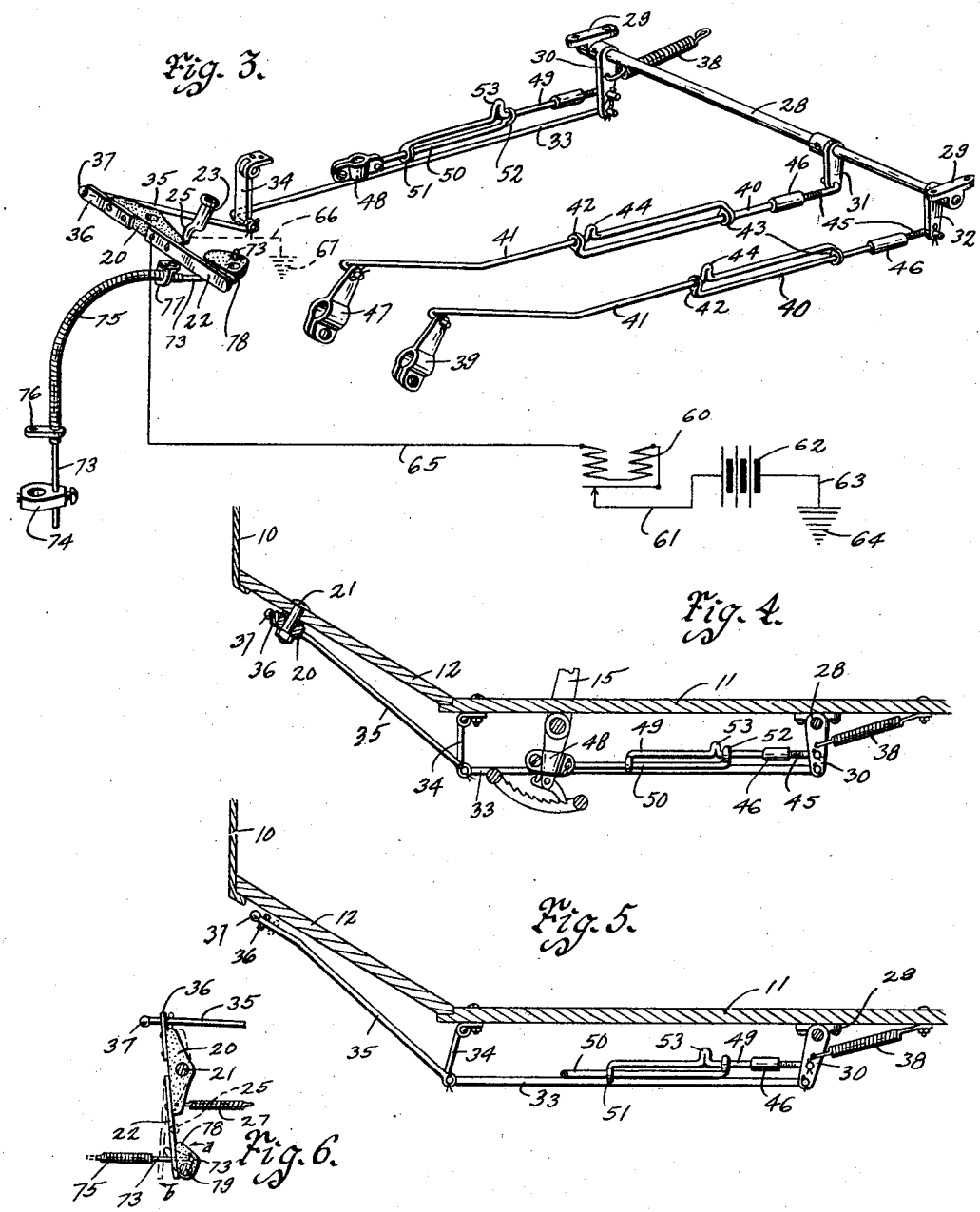

Patented Apr. 1, 1930

1,752,336

UNITED STATES PATENT OFFICE

JOHN G. ELLINGER, OF STOUT, IOWA

ACCELERATOR SAFETY LOCKING DEVICE AND BRAKE ALARM

Application filed July 1, 1929. Serial No. 375,144.

The object of this invention is to provide an improved locking device for the accelerator of motor vehicles which prevents the depression of the accelerator pedal while the emergency brake is set, thereby preventing injury to the vehicle through attempted operation while said brake is set.

A further object of the invention is to provide an improved accelerator safety locking device which prevents movement of the accelerator pedal simultaneously or in accompaniment with the operation of a member having to do with the operation of a motor vehicle such as a clutch pedal or a service or emergency brake lever.

Still another object of the invention is to provide an improved accelerator locking device and brake alarm arrangement which is effective for sounding a warning in the event the driver of a motor vehicle attempts to operate the accelerator while the brakes are set and which alarm may also be purposefully given for warning pedestrians or others adjacent the path of travel of the vehicle.

A further object of the invention is to provide an improved mechanism for automatically locking the accelerator pedal of a motor vehicle against operative movement whenever an operating member such as a clutch or brake lever is in operation, together with means for temporarily suspending the function of the accelerator locking device through the movement of another operating member such as the hand throttle of the vehicle.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a portion of a motor vehicle equipped with my improved accelerator locking and brake alarm device.

Figure 2 is a sectional elevation of the same on the line 2—2 of Figure 1.

Figure 3 is a perspective view showing my improved mechanism detached from the vehicle, having its several parts arranged in the relative positions which they occupy for practical use; this view also including a diagram of the electrical connections.

Figure 4 is a vertical section on the line 4—4 of Figure 1 showing particularly the mechanism for releasing the accelerator locking device through operation of the emergency brake lever.

Figure 5 is a similar view illustrating the construction of the parts for controlling the position of the accelerator locking means.

Figure 6 is a plan view partly in section of the accelerator locking device and the means for temporarily suspending the operation of the same.

Figure 7 is a detail section on the line 7—7 of Figure 1 illustrating the relative positions of the accelerator member and the locking device.

In the accompanying drawings I have illustrated a portion of a motor vehicle of common construction including a vertical dash member 10, horizontal floor board 11 and an inclined foot board 12 arranged at the front of said floor board. The vehicle also includes in addition to the other operating members, a clutch pedal 13 and a service brake pedal 14 extending through the inclined foot board 12 and a hand operated emergency brake lever 15 extending through the horizontal floor board 11.

The vehicle is also equipped with the usual foot operated accelerator pedal 16 extending through the foot board 12 adjacent to the brake pedal 14. The accelerator pedal is located close to the brake pedal 14 in order that it may conveniently be operated by pressure of the same foot which is employed for operation of the brake pedal. This proximity of the accelerator pedal 16 to the brake pedal 14 often results in inadvertent operation of the accelerator when the driver depresses the brake pedal 14 in an attempt to slacken the speed of the vehicle or to bring it to a stop, and such inadvertent use of the accelerator sometimes results in an accident to the vehicle and its occupants or to other vehicles or pedestrians in its path of travel.

In carrying out my improvement I employ an accelerator locking lever 20 which is mounted beneath the foot board 12 of the vehicle and is pivoted between its ends on a bolt 21 carried by said foot board. The locking lever 20 preferably is formed of wood or other suitable insulating material.

Fixed to and extending beyond the locking lever 20 is a metallic locking bar 22. The locking bar 22 is mounted on that end of the lever 20 toward the accelerator pedal 16, which will be referred to as the inner end portion of the locking lever, and said bar projects across and just forwardly of the accelerator member 16 where the latter member is slidably mounted through the foot board 12.

Mounted on and carried by the accelerator member 16 is a sleeve 23 which is adjustably mounted and held in place by a lock nut 24 threaded on the accelerator member. The sleeve 23 is formed with a finger 25 which extends laterally and downwardly through an opening 26 in the foot board 12 and is adapted to be engaged at times by the locking bar 22.

A coil spring 27 is fixed at one end to the inner portion of the locking lever 20 and at its opposite end to the underside of the foot board 12 and said spring tends to pull the locking lever rearwardly so that the locking bar 22 will engage beneath the finger 25. When so engaged the locking bar 22 serves to prevent downward movement of the finger 25 and thus holds the accelerator member 16 against operation.

A rock shaft 28 is arranged transversely beneath the floor board 11 at the rear of the clutch and brake levers of the vehicle and is journaled for oscillation in bearings 29 fixed to the lower surface of said floor board.

A plurality of crank arms are fixed to and extend downwardly from the rock shaft 28. These crank arms as shown are three in number and designated by the numerals 30, 31 and 32.

To the crank arm 30 is pivotally attached a rod 33 which extends forwardly beneath the foot board 11 and has its opposite end pivotally supported by a hanger 34 depending from the floor board. A releasing rod 35 is also pivotally attached to the hanger 34 and said releasing rod extends forwardly beneath the foot board 12. The releasing rod 35 extends slidably through an ear 36 which projects laterally from the outer end of the locking lever 20 and said rod is formed at its forward end with a head or stop 37 adapted to engage the ear 36, when the releasing rod is moved rearwardly, for moving the latching lever 20 to inoperative position against the action of the spring 27.

A coil spring 38 is attached at one end to one of the crank arms such as the arm 30 and at its opposite end to the lower face of the floor board 11. It is the function of the spring 38, which is of greater strength than the spring 27, to exert a rearward pull upon the depending crank arm 30 and thus pull rearwardly on the rod 33 and releasing rod 35 so that the locking bar 22 is normally held out of position for engagement by the finger 25. This is the normal position of the parts wherein the free operation of the accelerator is permitted. In order to accomplish a release of the accelerator locking means, I have provided connections between the rock shaft 28 and each of the levers associated with operation of the vehicle, namely the clutch lever 13, the foot brake lever 14 and the hand brake lever 15.

The connection to the clutch lever 13 includes a clamp 39 which is detachably connected to the shank of said lever beneath the foot board 12. The clamp member 39 has a slidable connection with the crank arm 32 of the rock shaft, this slidable connection being so arranged as to swing the crank 32 forwardly when the clutch lever 13 is operated and to permit an idling movement that does not affect the clutch lever when the rock shaft is oscillated through some other agency. To accomplish this I employ a pair of connecting rods 40 and 41 which are pivotally connected respectively with the crank arm 32 and the clamp 39 and which have a slidable connection with each other. The connecting rods 40 and 41 overlap each other and each is formed at its end with an eye 42 or 43 slidably embracing the other rod. One of the rods, such as 41, is formed with a stop 44 just rearwardly of the eye 42 of the other rod so that when the rod 41 is pulled forwardly by operation of the clutch lever 13, the pull is communicated to the rod 40 by engagement of the stop 44 with the eye 42, and thus the crank arm 32 is swung forwardly for rocking the shaft 28.

If desired the connecting rod 40 may have an adjustable connection with the crank arm 32 by means of a threaded stud 45 pivotally engaging the crank arm 32 and threaded into a socket 46 formed on the rear end of the rod 40.

The foot operated service brake 14 is provided with similar operating connections to the crank arm 31 of the rock shaft, including a clamp 47 and connecting rods 40 and 41 which are similar in all respects to the connecting rods previously described in connection with the clutch lever.

The hand operated emergency brake lever 15 is provided with similar connections to the crank arm 30, including a clamp 48 and connecting rods 49 and 50 which overlap and have sliding connection through eyes 51 and 52 formed thereon. In this instance the rod 49 is formed with a stop 53 located immediately in front of the eye 52 of the rod 50.

It will be noted that the rock shaft 28 will be oscillated against the action of the spring 38 whenever either of the levers 13, 14 or 15 is actuated in the manner prescribed for normally affecting the progress of the vehicle and that when the rock shaft is so oscillated it will cause a forward movement of the rod 33 and releasing rod 35 whereby the head or stop 37 is moved forward through the ear 36. This permits the spring 27 to pull the inner end of the locking lever 20 rearwardly so that the locking bar 22 engages beneath the finger 25 and thereby effects a locking of the accelerator member 16.

In other words whenever the clutch lever 13, service brake 14 or emergency brake 15 is operated, there is a release of the locking means permitting the locking bar 22 to prevent operation of the accelerator.

It will be noted that this locking engagement of the accelerator can act only at such times as the accelerator is in its elevated position, or in other words is not being depressed by the foot of the driver for otherwise the finger 25 could have been lowered far enough that the bar 22 would not engage beneath it. However, I have provided for this contingency by an alarm device which will be hereinafter described.

The automatic locking of the accelerator member whenever one or another of the levers is in operation has several important advantages and beneficial results.

The first of these advantages is that it prevents operation of the vehicle while the emergency brake is set. It is recognized as being good practice to set the emergency brake of a vehicle, through the hand lever 15, whenever the vehicle is not in operation. It sometimes occurs that the driver neglects to release the emergency brake upon starting the vehicle, but when the vehicle is equipped with my improved locking means, the driver will of course find it impossible to use the accelerator so long as the emergency brake is set. After he attempts to do so he will soon discover that something is wrong and will be warned that he should release the emergency brake.

Another important advantage, particularly from the standpoint of safety, is that the accelerator can not be used while either of the levers is in operation. In other words, the driver will be restrained from either purposely or inadvertently attempting to accelerate the speed of a vehicle already in motion at such times as the clutch is disengaged by actuation of the clutch lever 13 or at such times as the service brake is applied through actuation of the lever 14 or the emergency brake through actuation of the lever 15.

The most significant advantage in this connection is probably that the accelerator member 16 cannot be accidentally operated at the same time that the service brake is applied through the foot lever 14.

I have also provided electric means for sounding an alarm at certain times through operation of the safety device. The alarm may include a buzzer device 60 which is connected by a conductor 61 with a battery 62 which may be the battery employed in the ignition system of the vehicle and which ordinarily is connected by a wire 63 to ground at the point 64. The buzzer 60 is connected by a conductor wire 65 with the metallic locking bar 22 as shown in Figure 3. The metallic sleeve 23 on the accelerator member is suitably connected as by a wire 66 with the frame of the vehicle to constitute a grounding at the point 67.

By means of these electrical connections, which are normally in open circuit through spacing of the locking bar 22 and finger 25, it follows that the circuit will be closed and the alarm sounded whenever the locking bar is permitted to move to locking position and is engaged by the finger 25. This may occur in an attempted operation of the accelerator simultaneously with operation of either of the clutch or brake levers, and thus warn the driver of the attempted improper operation.

It will be noted that in case the accelerator member 16 is already depressed when the locking bar 22 is permitted to move toward locking position, a locking engagement cannot occur providing the accelerator is lowered sufficiently that the point of the finger is below the upper edge of the locking bar. In other words, a depression of the accelerator in advance of operation of clutch or brake, might prevent the desired locking engagement.

However, in such a contingency, the side of the locking bar 22 would engage a lateral side of the finger 25, thus closing the circuit previously described and sounding an alarm which would warn the driver of the attempted improper operation.

In addition to these functions of the alarm, it may also be purposely operated to sound a gentle alarm, in contradistinction to the more violent alarms usually given by means of horns or sirens and which frequently have the effect of startling a pedestrian and causing him to place himself in greater danger than before. This gentle alarm may be purposefully sounded by slightly depressing the clutch lever 13 or the brake lever 14 and at the same time or slightly thereafter depressing the accelerator member 16 so that the side of the finger 25 will contact with the adjacent side of the locking bar 22.

At times it may be desirable to temporarily suspend the function of the locking means so that the accelerator will not be locked against operation even though the clutch lever or emergency brake be in use. For instance, there are times when it is necessary to start the motor with the emergency brake applied, particularly when the vehicle is standing on an inclined surface. It will be noted that prevention of operation of the locking means could be accomplished if the operator should not allow the accelerator to be entirely released before setting the brakes. In other words he might hold the accelerator member 16 down until the brakes be applied by operation of the hand lever 15, thus maintaining the point of the finger 25 beneath the level of the locking bar 22. This, however, would require forethought at the time of stopping the vehicle and furthermore, presuming that the mechanism is equipped with the automatic alarm heretofore referred to, it is obvious that such action would result in a constant sounding of the alarm which would be undesirable.

For this reason I have provided a suspending means associated with the operation of the hand throttle of the vehicle.

The hand throttle lever (not shown) is usually located on or near the steering wheel of the vehicle and is connected with the throttle valve mechanism 70 and the carburetor 71 by means of a movable member 72 which is the present instance is designed for vertical reciprocation.

I have provided a flexible wire member 73 which is attached by means of a clamp 74 to the throttle operating member 72. The wire 73 may be protected by a tube or conduit 75 suitably supported by brackets 76 and 77.

A cam releasing member 78 is mounted beneath the foot board 12 and is pivoted on a bolt 79 adjacent the free end of the locking bar 22. The cam member 78 is formed with an elongated point eccentric to its pivot and adapted to engage the locking bar as indicated by dotted lines in Figure 6 for moving and holding said locking bar out of operative position. The wire 73 is attached to the cam member 78 between its pivot and its free end and when the throttle lever is moved for opening the throttle, a pull is exerted on the wire 73 which oscillates the cam 78 in the direction of the arrow *a* in Figure 6, thereby moving the bar 22 in the direction of the arrow *b*.

Thus, the function of the locking means may be temporarily suspended and the locking bar be held against movement through operation of the hand throttle lever.

It is obvious that I have provided a brake alarm and accelerator safety mechanism which is effective in adding materially to safe operation of a motor vehicle equipped therewith.

If desired, the alarm feature may be omitted and it is also apparent that the connections to any one of the levers, such for instance as the clutch lever 13, may be omitted if desired and dependence be placed upon connection to the brake lever or levers alone.

It will also be noted that wear on the brake and clutch mechanism will not affect the successful operation of this device for the reason that the initial part of the movement of the levers is sufficient to operate the safety mechanism to locking or operative position. It will be noted further that the device is capable of being adjusted to various positions of sensitiveness through manipulation of the various connections shown and described.

I claim as my invention:

1. The combination with a lever associated with the operation of a motor vehicle and an accelerator member arranged for depression, of an accelerator locking mechanism, comprising a laterally projecting finger on said accelerator member, a locking lever having a part arranged to be moved beneath said finger, a spring tending to move said locking lever to locking position, a releasing member adapted for engagement with said locking lever to move it to inoperative position, a spring normally acting to hold said releasing member in engagement with said locking lever, and means connected with said vehicle operating lever for causing said releasing member to move out of engagement with the locking lever, whereby the locking lever may move to locking position when said vehicle operating lever is actuated.

2. The combination with a lever associated with the operation of a motor vehicle and an accelerator member arranged for depression, of an accelerator locking mechanism, comprising a laterally projecting finger on said accelerator member, a locking lever having a part arranged to be moved beneath said finger, a spring tending to move said locking lever to locking position, a releasing member adapted for engagement with said locking lever to move it to inoperative position, a spring normally acting to hold said releasing member in engagement with said locking lever, and means connected with said vehicle operating lever for causing said releasing member to move out of engagement with the locking lever whereby the locking lever may move to locking position when said vehicle operating lever is actuated, and means for temporarily suspending the function of said locking mechanism through actuation of another member associated with the operation of the vehicle.

3. The combination with a lever associated with the operation of a motor vehicle and an accelerator member arranged for depression, of an accelerator locking mechanism, comprising a laterally projecting finger on said accelerator member, a locking lever having a part arranged to be moved beneath said finger, a spring tending to move said locking lever to locking position, a releasing member adapted for engagement with said locking lever to move it to inoperative position, a spring normally acting to hold said releasing member in engagement with said locking lever, means connected with said vehicle operating lever for causing said releasing member to move out of engagement with the locking lever, whereby the locking lever may move to locking position when said vehicle operating lever is actuated, and means for sounding an audible alarm upon attempted operation of said accelerator member when the locking lever is in operative position.

4. A safety locking mechanism for a motor vehicle having a lever associated with its operation and an accelerator member arranged to be depressed, said mechanism comprising a laterally projecting portion on said accelerator member, a spring-pressed locking lever having a part arranged to be moved beneath said projecting portion, a releasing member arranged for engagement with said locking lever to move the latter to inoperative position, a rock shaft arranged for oscillation and having a crank arm to which said releasing member is connected, yielding means for normally holding said rock shaft in one position, and connections between the vehicle operating lever and said rock shaft for moving the latter against the influence of said yielding means, whereby said locking lever is released from said releasing member and permitted to move to locking position upon actuation of said vehicle operating lever.

5. A safety locking mechanism for a motor vehicle having a lever associated with its operation and an accelerator member arranged to be depressed, said mechanism comprising a laterally projecting portion on said accelerator member, a spring-pressed locking lever having a part arranged to be moved beneath said projecting portion, a releasing member arranged for engagement with said locking lever to move the latter to inoperative position, a rock shaft arranged for oscillation and having a crank arm to which said releasing member is connected, yielding means for normally holding said rock shaft in one position, and connections between the vehicle operating lever and said rock shaft for moving the latter against the influence of said yielding means, whereby said locking lever is released from said releasing member and permitted to move to locking position upon actuation of said vehicle operating lever, and means operable at times for holding said locking lever out of operative position irrespective of the position of said releasing member.

6. A safety locking mechanism for a motor vehicle having a lever associated with its operation and an accelerator member arranged to be depressed, said mechanism comprising a laterally projecting portion on said accelerator member, a spring-pressed locking lever having a part arranged to be moved beneath said projecting portion, a releasing member arranged for engagement with said locking lever to move the latter to inoperative position, a rock shaft arranged for oscillation and having a crank arm to which said releasing member is connected, yielding means for normally holding said rock shaft in one position, and connections between the vehicle operating lever and said rock shaft for moving the latter against the influence of said yielding means, whereby said locking lever is released from said releasing member and permitted to move to locking position upon actuation of said vehicle operating lever, said projecting portion of the accelerator member and the part on said locking lever for engagement therewith being in open circuit with an alarm device which is adapted to be operated when said portion and part are in mutual contact.

7. A safety locking mechanism for a motor vehicle having a plurality of levers associated with its operation and an accelerator member arranged to be depressed, said mechanism comprising a laterally projecting portion on said accelerator member, a spring-pressed locking lever having a part arranged to be moved beneath said projecting portion, a releasing member arranged for engagement with said locking lever to move the latter to inoperative position, a rock shaft arranged for oscillation and having a crank arm to which said releasing member is connected, yielding means for normally holding said rock shaft in one position, and connections between each of the vehicle operating levers and said rock shaft for moving the latter against the influence of said yielding means, whereby said locking lever is released from said releasing member and permitted to move to locking position upon actuation of either of said vehicle operating levers.

8. A safety locking mechanism for a motor vehicle having a plurality of levers associated with its operation and having an accelerator member arranged to be depressed, comprising a sleeve on said accelerator member, a spring-pressed locking lever having a part arranged to be moved beneath said sleeve, a rock shaft having a plurality of crank arms, a spring tending to hold said rock shaft in one direction, a releasing member connected with one of said crank arms and having a sliding connection with said locking lever for moving the same to inoperative position under the influence of the spring acting on said rock shaft, and connecting means between each of the vehicle operating levers and the rock shaft for moving the latter against the influence of its spring, whereby the releasing member is moved to permit the locking lever to move to operative position when either of said vehicle operating levers is actuated.

9. A safety locking mechanism for a motor vehicle having a plurality of levers associated with its operation and having an accelerator member arranged to be depressed, comprising a sleeve on said accelerator member, a spring-pressed locking lever having a part arranged to be moved beneath said sleeve, a rock shaft having a plurality of crank arms, a spring tending to hold said rock shaft in one direction, a releasing member connected with one of said crank arms and having a sliding connection with said locking lever for moving the same to inoperative position under the influence of the spring acting on said rock shaft, and connecting means between each of the vehicle operating levers and the rock shaft for moving the latter against the influence of its spring, whereby the releasing member is moved to permit the locking lever to move to operative position when either of said vehicle operating levers is actuated, the connection between each vehicle operating lever and the rock shaft being formed of two members having a free relative movement in one direction when the rock shaft is oscillated by another agency.

10. The combination with a lever associated with the operation of a motor vehicle and an accelerator member arranged for depression, of an accelerator locking mechanism, comprising a laterally projecting finger on said accelerator member, a locking lever having a part arranged to be moved beneath said finger, a spring tending to move said locking lever to locking position, a releasing member adapted for engagement with said locking lever to move it to inoperative position, a spring normally acting to hold said releasing member in engagement with said locking lever, and means connected with said vehicle operating lever for causing said releasing member to move out of engagement with the locking lever, whereby the locking lever may move to locking position when said vehicle operating lever is actuated, a cam member pivotally mounted adjacent said locking lever and arranged to engage a part on the same, and means connected with the manual throttle operating means for the vehicle for actuating said cam member and moving said locking lever to inoperative position.

Des Moines, Iowa, June 21, 1929.

JOHN G. ELLINGER.